United States Patent [19]

Kraicar et al.

[11] 4,309,577
[45] Jan. 5, 1982

[54] CIRCUIT FOR CLOSING THE REMOTE FEED LOOP OF A SERIES-SUPPLIED REPEATER

[75] Inventors: Heinz Kraicar, Poecking; Alfred Ziegler, Munich, both of Fed. Rep. of Germany

[73] Assignee: Siemens Aktiengesellschaft, Berlin & Munich, Fed. Rep. of Germany

[21] Appl. No.: 96,791

[22] Filed: Nov. 23, 1979

[30] Foreign Application Priority Data

Dec. 6, 1978 [DE] Fed. Rep. of Germany ....... 2852810

[51] Int. Cl.³ .............................................. H04B 3/44
[52] U.S. Cl. ........................ 179/170 J; 179/175.31 R
[58] Field of Search ...................... 179/170 J, 175.3 F, 179/175.31 R; 370/15

[56] References Cited

U.S. PATENT DOCUMENTS 3,179,754  4/1965  Ingram ........................ 179/175.31 R
3,297,833  1/1967  Hooten ........................ 179/175.31 R

FOREIGN PATENT DOCUMENTS 7626     2/1980   European Pat. Off. ......... 179/170 J
1102215  3/1961   Fed. Rep. of Germany ... 179/175.3 F
1267267  5/1968   Fed. Rep. of Germany .
1902090  9/1970   Fed. Rep. of Germany ... 179/170 J
2318226  3/1974   Fed. Rep. of Germany .
1135716  12/1968  United Kingdom .
1232167  5/1971   United Kingdom ............. 179/170 J Primary Examiner—Bernard Konick
Assistant Examiner—Randall P. Myers
Attorney, Agent, or Firm—Hill, Van Santen, Steadman, Chiara & Simpson

[57] ABSTRACT

A circuit closes a remote feed loop of a series-supplied repeater in a communications channel, in the event of an interruption in the transmission line, by means of a relay which senses an interruption in the feed current to close a shunt circuit. The shunt circuit includes a resistance which is initially high, to promote rapid restoration of the communications circuit, and afterwards is lowered to minimize losses and to promote personal safety.

5 Claims, 6 Drawing Figures

CIRCUIT FOR CLOSING THE REMOTE FEED LOOP OF A SERIES-SUPPLIED REPEATER

FIELD OF THE INVENTION

The present invention relates to a circuit for closing the remote feed loop of a series-supplied repeater in a communications channel.

The Prior Art

Repeaters are employed in transmission lines when amplification of the signals traversing the transmission line is necessary or desirable. In order to avoid the need for a power supply to a remote location, such repeaters are sometimes powered by power supplies which are located remotely relative to the repeaters, the individual repeaters being powered by electrical energy which they derive directly from the transmission line. In order to continue service on the transmission line during a period in which part of the transmission line is interrupted, two power supplies may be employed, one at each end of the transmission line, so that even when the transmission line is interrupted and divided into two sections, the repeaters in both sections can receive power independently from their individual power supplies. It is necessary, however, to provide a circuit arrangement for closing the loop when an interruption occurs, so that a continuous path may be maintained for the current flowing from the power supply.

Such a circuit arrangement is known from British Pat. No. 1,232,167. The system described in the patent incorporates relay coils connected in series with the transmission line, for sensing an interruption in the current in the transmission line, and for closing a shunt path through at least two diodes and a resistor in response to a cessation of such current. The shunt path provides a return path for the transmission line current, when the regular return path through the entire transmission line is interrupted. In this way, the energy supply is maintained even with an interruption at any random location in the transmission line, so that no interruption of the communication transmission occurs within the functioning parts of the line. After the interruption is corrected, the normal connection is automatically reestablished, by current flowing through the relay. Typically, constant current sources are provided for the power supplies at either end of the transmission line.

During an interruption of the transmission line, all of the relays (one for each repeater) are released, with each of the relays establishing a shunt connection. Thus, current flows from the power supply through all of the shunt connections, establishing a voltage drop across the shunt resistor. As a result of the shunt current flow, the relays of repeater locations between the power supply and the interruption are operated, opening their shunt connections, and reestablishing normal operation for all repeater locations up until the last repeater location before the interruption, which maintains its shunt connection. The reopening of the shunt connections occurs one at a time, as each of the relays senses the increasing current flowing through the downstream shunt connections. Preferably, the reopening of the shunt connections occurs as rapidly as possible, to cause a minimum interference with communications on the uninterrupted portions of the transmission lines. This requires a relatively high shunt resistance. On the other hand, the shunt resistance should be as low as possible in order to minimize heat losses at the repeater locations, and to maintain the voltage across the two conductors of the transmission line less than a maximum value at the point of the interruption. At the same time, the voltage drop across the shunt paths must be high enough so that the shunt paths of the various repeaters operate sufficiently quickly after an interruption, notwithstanding the relatively high input voltage of the downstream repeaters, that the operation voltage at the individual repeaters does not fall below the design minimum during the switching period of a few milliseconds. This requires that the voltage drop across the shunt resistor be much greater than the input voltage of the individual repeaters. It should not, however, exceed a predetermined maximum voltage level at the place of the interruption, for reasons of personal safety.

The same considerations of the value of the shunt resistor apply in the case in which a series of repeaters are fed from only one end of a transmission line, and the power feeding circuit is briefly interrupted, so that all the relays are released. The power feeding circuit should be completed as quickly as possible when the interruption is terminated.

The above considerations have imposed contradictory requirements on the value of the shunt resistors, and previous attempts to select values for the shunt resistors have necessarily resulted in compromises.

BRIEF DESCRIPTION OF THE INVENTION

It is a principal object of the present invention to provide a circuit arrangement for closing the remote feed loop of a series-supplied repeater in such a manner that the remote feed circuit can always be quickly recompleted upon the occurrence of an interruption of the remote feed circuit.

In accordance with one embodiment of the present invention, the circuit arrangement for achieving this object incorporates a shunt resistance which may be switched from a first resistance value to a second value, by means of a timer circuit. This enables the circuit to fulfill the contradictory requirements of rapid operation of the relays at the repeater stations, while maintaining a low voltage across the shunt path adjacent the transmission line interruption.

In a more specific embodiment of the invention, the shunt resistance comprises a partial resistance which may be short-circuited by means of a bridge circuit. The bridge circuit incorporates a thyristor which is controlled by means of an RC timing circuit.

In another embodiment of the present invention, a thermally operated switch is connected in parallel with the partial resistance, to achieve a particularly high degree of personal safety, and to insure a voltage reduction at the repeater location adjacent the interruption in the transmission line.

Preferably, a first resistance value is dimensioned to give a voltage drop across the shunt path higher than the input voltage of a repeater station. A second resistance value is dimensioned so that the voltage drop across it is smaller than a maximum predetermined voltage chosen with regard to the personal safety of a person working at the repeater station.

These and other objects and advantages of the present invention will become manifest by an inspection of the accompanying drawings and the following description.

BRIEF DESCRIPTION OF THE DRAWINGS

Reference will now be made to the accompanying drawings, in which.

DESCRIPTION OF THE PREFERRED EMBODIMENTS

Figure 1:
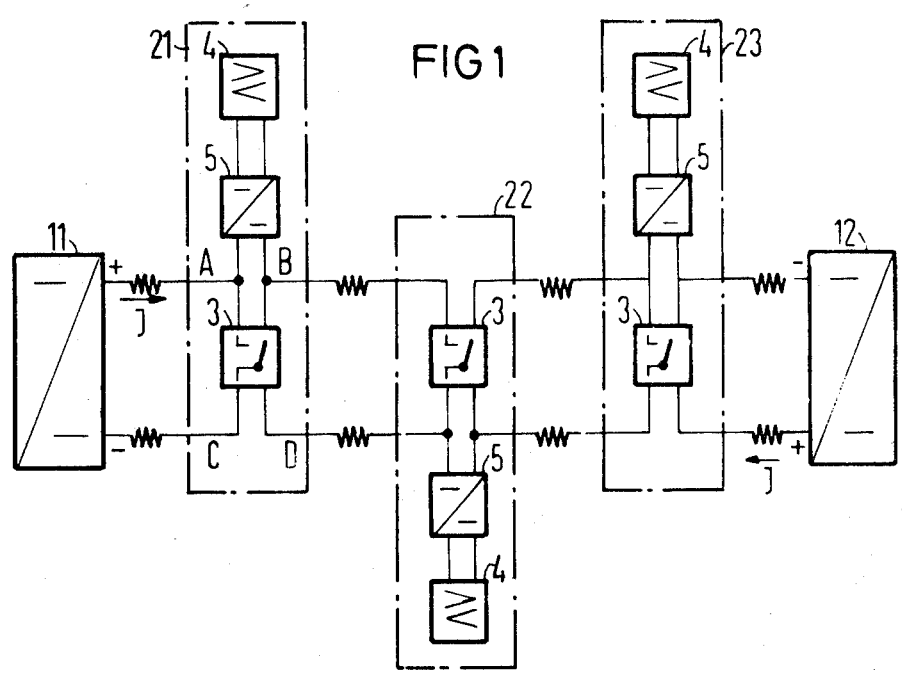
FIG. 1 is a circuit diagram of a communications transmission line incorporating a plurality of repeater stations, each equipped with a circuit according to the present invention.

FIG. 1 illustrates a transmission line arrangement incorporating three repeaters 21, 22 and 23, each having bidirectional amplifiers 4, and a converter 5 for furnishing electrical power to the amplifiers 4. The converters 5 are connected in series with the transmission line which extends between two constant current power sources 11 and 12. The constant current flowing through the transmission line, and through each of the converters 5, furnishes the power required for the operation of the amplifiers 4. The current also flows through the impedance of the transmission line, which is represented in FIG. 1 by a plurality of resistors in series with the transmission line between the power supplies 11 and 12 and the repeaters 21, 22 and 23. The transmission line may be a two-line arrangement, or a coaxial transmission line. In the case of a coaxial line, separate feed lines may be incorporated in the packing of the cable. Preferably, the repeaters 21-23 are connected to alternate sides of the transmission line, so as to achieve a uniform load distribution along the length of the line. If necessary, however, all of the repeaters may be inserted into the same one of the two conductors.

The provision of two power supplies 11 and 12 allows redundancy, and the normal current flows in a series path through both of the power supplies. Each of the power supplies may supply the entire transmission line, if a connection to either power supply is interrupted. In this way, the repeater locations continue to remain in operation even during such interruption. If only one power supply is employed, the unused power supply may be replaced by a short circuit.

Each of the repeater locations is provided with a switching auxiliary 3, which normally closes the remote feed circuit, and establishes a shunt connection adjacent the location of any interruption on the transmission line. In this way, the converters 5 between the power supply and the interruption continue to be supplied with a series current. The details of the switching auxiliary are illustrated in greater detail in FIGS. 2 and 3.

Figure 2:
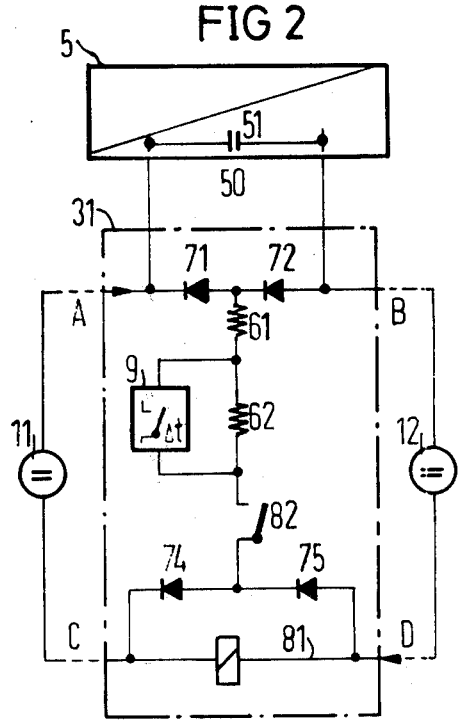
FIGS. 2 and 3 are alternative embodiments of circuits constructed in accordance with the present invention.

FIG. 2 shows the switching auxiliary connected at terminals A, B, C and D, corresponding to the terminals A, B, C and D of the repeater location 21 shown in FIG. 1. A sensitive relay 81 is connected in series between terminals C and D, and the converter 5 is connected between terminals A and B. The relay 81 is normally in its operated condition, as the result of current flowing between terminals C and D, so that its contact 82 is open. The contact 82 is in a shunt circuit incorporated in resistors 61 and 62, such shunt circuit extending between the intermediate terminal of series connected diodes 71 and 72, and the intermediate terminal of series connected diodes 74 and 75. The diodes 71 and 72 are connected across the input terminals of the converter 5, and the diodes 74 and 75 are connected across the relay 81. A time delay switch 9 is connected in parallel with the resistor 62. The voltage across the relay 81 consists of the combined forward voltage drops across the diodes 74 and 75, and the relay 81 is designed to operate with this input voltage.

When an interruption occurs in the circuit extending between terminals B and D, the converter 5 continues to be operated from the power supply 11. The relay 81 is deenergized, closing its contact 82 and establishing a shunt circuit. Current then flows from terminal A through the converter 5, the diode 72, resistors 61 and 62, the contact 82, and diode 74 back to terminal C.

If the line interruption occurs between terminals A and C, the power supply 12 continues to power the converter 5. Again, the relay 81 is deenergized, closing the contact 82. Current then flows from terminal D through the diode 75, contact 82, resistors 61 and 62, diode 71, and through the converter 5 back to terminal B. After a time interval, time switch 9 is closed, short-circuiting resistor 62, as described in more detail hereinafter.

Figure 3:
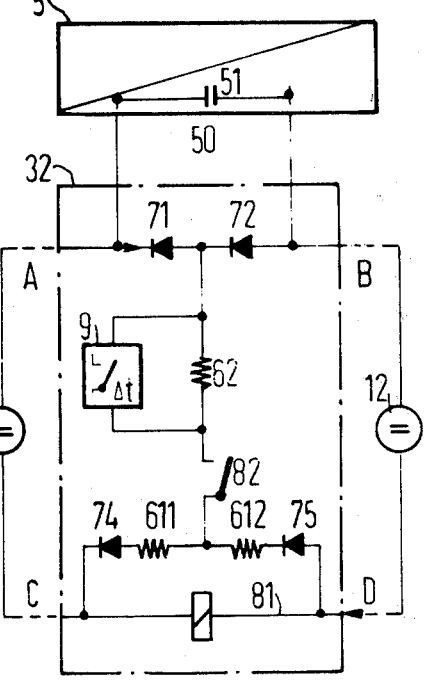

FIG. 3 illustrates a circuit arrangement in which a less sensitive relay 81 may be employed. The resistor 61 of FIG. 2 is omitted, and instead a pair of resistors 611 and 612 are connected in series with the diodes 74 and 75, with the common terminal of such resistors being connected with the shunt circuit including the contact 82. The normal feed current flows through the diodes 74 and 75 and through the resistors 611 and 612, producing a greater voltage drop, so that the relay 81 may have a higher operating voltage.

In the circuits of both FIGS. 2 and 3, the diode bridge incorporating diodes 71-75 enables the use of only a single relay 81, irrespective of the location in the transmission line where interruption occurs. When it is desired to employ only a single power supply, the diodes 71-75 are not necessary. For example, when only the power supply 11 is used, the diodes 72 and 74 are replaced by short circuits, and the diodes 71 and 75 are omitted.

In the circuit of FIG. 2, the combined resistance of resistors 61 and 62 is selected so large that the proper functioning of all of the switching circuits 3 in the transmission line is guaranteed, subsequent to a brief interruption in the remote feed, without loss of power to the converters 5. The maintenance of operating voltage at the input of the converter 5 can be facilitated by a capacitor 51 connected across the input terminals 50 of the converter. The capacitors 51, in combination with the free-wheeling diodes 71 and 72, serve to bridge brief interruptions of the remote feed.

The time delay switch 9 is adapted to short-circuit the resistor 62 to reduce the voltage drop across the shunt circuit, so as to minimize heat losses in the shunt circuit. The time delay $\Delta t$ is selected to be so short that the high resistance represented by series resistors 61 and 62 is present only during a time which safely allows switching operations to occur. For example, switching operations can take place in about 10 milliseconds, and a delay time may be selected in the range of approximately 100 milliseconds, so that contact protection is guaranteed at the vicinity of the interruption in the transmission line. The switching operations take place so rapidly, so that a person in the vicinity of the transmission line interruption is protected from high voltages which may, without the use of the present invention, occur immediately following an interruption.

Figure 4:
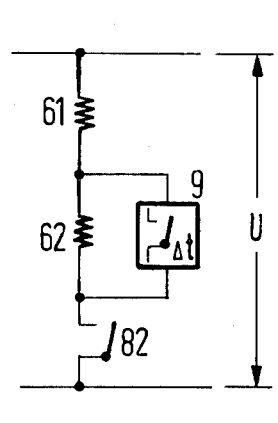
FIG. 4 is a circuit diagram of a portion of the apparatus illustrated in FIG. 2.
Figure 5:
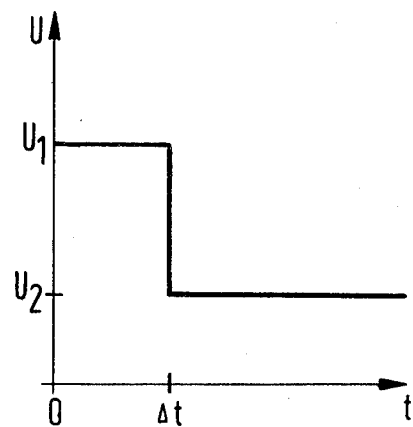
FIG. 5 is a diagram of the voltage, with respect to time, across the circuit illustrated in FIG. 4.

Referring to FIG. 4, which shows the time delay switch 9 in the shunt circuit, the voltage drop across the shunt circuit is indicated by the reference letter U. FIG. 5 illustrates a diagram of the voltage across the shunt circuit with time, illustrating how, after a delay of $\Delta t$, the voltage drops from U1, a relatively high voltage, to U2, a voltage level which is safe to an operator in the vicinity.

The time delay switch 9 is also connected in parallel with the resistor 62 in the embodiment of FIG. 3. In this embodiment, either the resistor 611 or the resistor 612 is in effective series connection with the resistor 62 during the initial period following an interruption of the transmission line, and after the resistor 62 is shunted by the switch 9, only the resistor 611, or 612, respectively, remains in the circuit.

Figure 6:
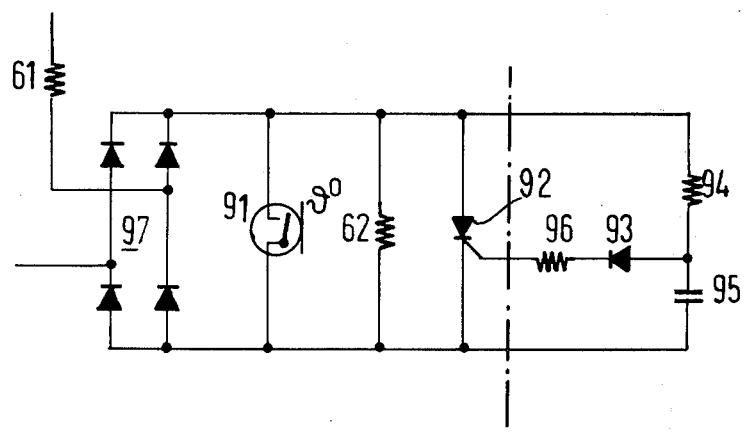
FIG. 6 is a schematic diagram of a bridge circuit controlled by a timer circuit.

FIG. 6 illustrates an embodiment of a time delay switch 9. The active portion of the switch is a thyristor 92, which is interconnected between terminals of a diode bridge network 97. The diode bridge is interconnected between the resistor 61 and the contact 82 (not shown in FIG. 6). The diode bridge insures that the correct voltage differential is applied against the thyristor 92, with a relatively positive voltage applied to its anode, and a relatively negative voltage applied to its cathode. A series circuit including a resistor 94 and a capacitor 95 are connected across the anode and cathode terminals of the thyristor 92, and the junction of the resistor 94 and the capacitor 95 is connected to the gate of the thyristor 9 through a resistor 96 and a four-level diode 93. Such diodes are commonly known as trigger diodes or diacs. The resistor 62 is also connected in parallel with the anode and cathode terminals of the thyristor 92.

When the shunt circuit is made effective, by closure of the contact 82, the voltage applied across the RC network including resistor 94 and capacitor 95 causes triggering of the thyristor 92 after a time interval, depending on the RC time constant. The thyristor 92 then short-circuits the resistor 62, reducing the resistance of the circuit to substantially that of the resistor 61. A thermally operated switch 91 is also connected in parallel with the resistor 62 and located in physical close proximity with it, so that if for some reason the thyristor circuit fails, heating in the resistor 62 causes the thermally operated switch to close its contact, thereby short-circuiting the resistor 62. The presence of the thermally operated switch gives a particularly high degree of safety to the circuit, even if there should be a failure in the thyristor.

In place of the diode bridge 97 and the thyristor 92, a triac may be employed if desired.

By use of the present invention, the change in the effective resistance in the shunt circuit achieves the advantage of making it unnecessary to compromise the resistance level of the shunt circuit in order to comply with contradictory requirements. On the contrary, through the use of the present invention, the most desirable resistance values may be selected both for a period immediately after an interruption in the transmission line, and for a subsequent period.

In one arrangement, the circuit of FIG. 2 had the following components, employing a constant feed current of 300 ma:
R61: 132 ohms
R62: 330 ohms The voltage drop across the converter 5 is about 65 volts. The converters supply the necessary voltage levels to the amplifiers 4. It will be understood that while the amplifiers have been illustrated only diagrammatically, the boxes 4 contain a repeater and amplifier for each direction of each transmission system. Thus, if two communication transmissions are carried by the transmission lines illustrated in FIG. 1, four repeaters and amplifiers are contained in each of the boxes 4.

It will be apparent that various modifications and additions may be made in the apparatus of the present invention without departing from the essential features of novelty thereof, which are intended to be defined and securely by the appended claims.

What is claimed is:

1. A circuit for closing the current feed loop for a series-supplied repeater station in response to an interruption in the transmission line, comprising in combination a relay connected in series with said transmission line, a shunt circuit including a shunt resistor and a contact of said relay in series therewith, said relay connecting said shunt circuit into circuit with said feed loop in response to said interruption, and timer circuit means for changing the resistance of said shunt circuit from a first value to a second value of lower resistance than said first value a predetermined time after occurrence of said interruption, whereby said first value gives a voltage across said shunt circuit which is higher than the required supply voltage of a repeater station.

2. Apparatus according to claim 1, wherein said shunt resistor comprises two resistors connected in series, said timer circuit being connected to short-circuit one of said resistors after said predetermined time.

3. Apparatus according to claim 2, including a thermally operated switch connected in parallel with said one resistor and adapted to respond to heat generated by current flowing through said resistor to short-circuit said one resistor.

4. Apparatus according to claim 1, wherein said timer circuit comprises a thyristor and an RC time constant circuit for triggering said thyristor after said predetermined time.

5. Apparatus according to claim 1, wherein said second value is chosen so that the voltage drop caused by the feed current flowing therethrough is less than the maximum safe voltage to which a person may be safely exposed.

* * * * *